(12) United States Patent
Magistrale

(10) Patent No.: US 8,465,820 B2
(45) Date of Patent: Jun. 18, 2013

(54) METHOD AND PLANT FOR THE PRODUCTION OF A CASING FOR A SOLID-PROPELLANT ENGINE, AND CASING MADE ACCORDING TO SAID METHOD

(75) Inventor: Giuseppe Magistrale, Frosinone (IT)

(73) Assignee: AVIO S.p.A., Turin (IT)

( * ) Notice: Subject to any disclaimer, the term of this patent is extended or adjusted under 35 U.S.C. 154(b) by 0 days.

(21) Appl. No.: 13/287,241

(22) Filed: Nov. 2, 2011

(65) Prior Publication Data

US 2012/0042629 A1    Feb. 23, 2012

Related U.S. Application Data

(62) Division of application No. 12/136,965, filed on Jun. 11, 2008, now Pat. No. 8,071,005.

(30) Foreign Application Priority Data

Jun. 13, 2007  (IT) ............... TO2007A0419

(51) Int. Cl.
*F02K 9/34* (2006.01)
*B29D 22/00* (2006.01)
(52) U.S. Cl.
USPC .......................................... 428/36.8; 60/253

(58) Field of Classification Search
USPC ................. 428/36.8; 60/253, 263; 138/96 R, 138/96 T
See application file for complete search history.

(56) References Cited

U.S. PATENT DOCUMENTS

| | | | | |
|---|---|---|---|---|
| 3,347,047 | A | * | 10/1967 | Hartz et al. ..................... 60/253 |
| 3,453,691 | A | | 7/1969 | Groves |
| 3,686,868 | A | * | 8/1972 | Chase et al. ................. 60/200.1 |
| 3,973,397 | A | * | 8/1976 | Chase et al. .................... 60/253 |
| 4,458,483 | A | * | 7/1984 | Vetter ............................. 60/253 |
| 6,554,936 | B1 | * | 4/2003 | Metcalf et al. ................ 156/172 |
| 6,566,420 | B1 | * | 5/2003 | Guillot et al. ................. 523/138 |
| 7,537,719 | B2 | | 5/2009 | Sueoka et al. |
| 2003/0168761 | A1 | | 9/2003 | Hirose et al. |
| 2005/0046077 | A1 | | 3/2005 | Sueoka et al. |

* cited by examiner

*Primary Examiner* — Gwendolyn Blackwell
*Assistant Examiner* — Susan R Dye
(74) *Attorney, Agent, or Firm* — Fish & Richardson P.C.

(57) ABSTRACT

A casing of a solid-propellant engine comprising a core and a layer of elastomeric material, set as coating for at least part of the core to provide a thermal protection of the core itself is obtained by: inserting the core in a forming mold so as to make within the mold two annular chambers separated from one another by the core; forming a strand of elastomeric material; obtaining a defined portion of elastomeric material by cutting the strand transversely to size in an external environment; and injecting the cut portion of elastomeric material simultaneously within both of the annular chambers.

3 Claims, 4 Drawing Sheets

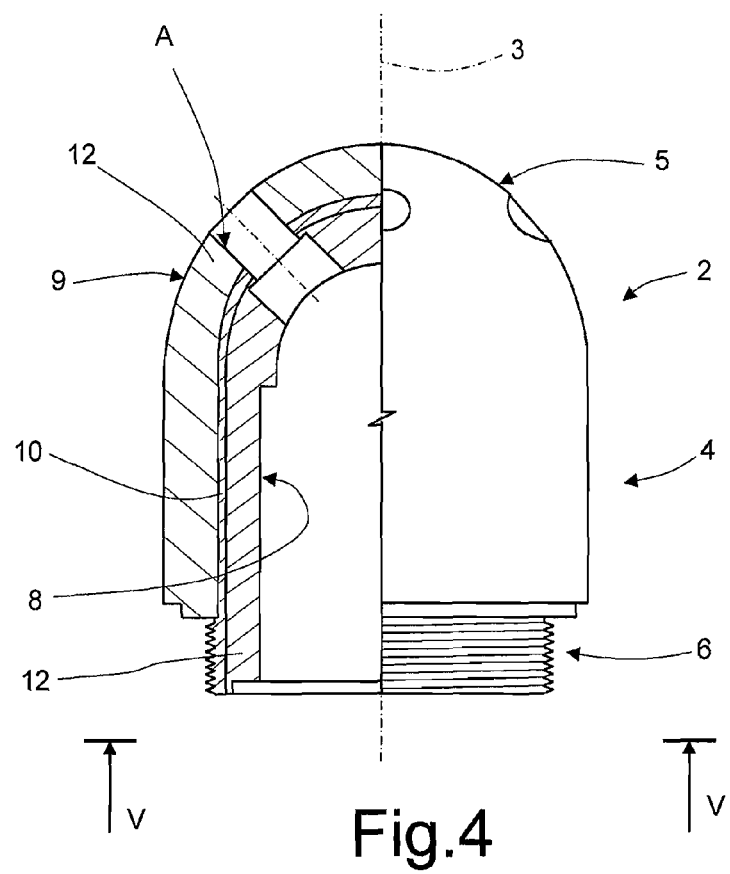
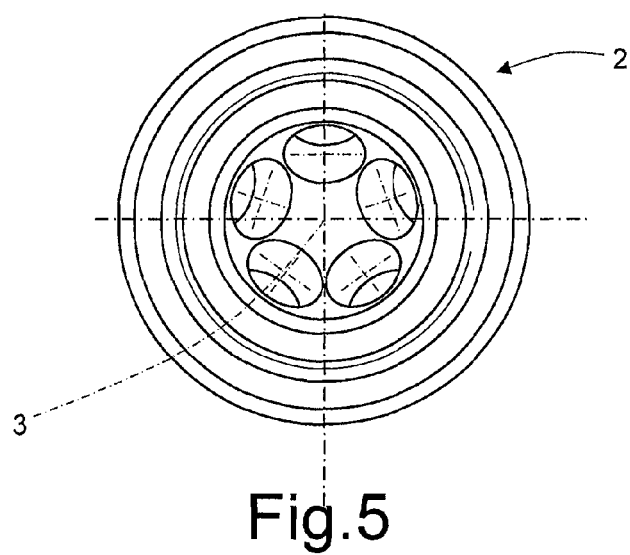

METHOD AND PLANT FOR THE PRODUCTION OF A CASING FOR A SOLID-PROPELLANT ENGINE, AND CASING MADE ACCORDING TO SAID METHOD

The present invention relates to a method for producing a casing for a solid-propellant engine for a rocket engine.

BACKGROUND OF THE INVENTION

As is known, a solid-propellant engine comprises a casing filled with solid propellant, a device for ignition of the propellant, and a terminal nozzle, through which the propellant, by burning, generates a desired propulsive thrust. The casing comprises a core made of steel or of a composite material, which has a cylindrical tubular portion and a closing portion shaped like a spherical cap and is insulated by being coated both internally and externally with a layer of specific thermally insulating material to define an adequate thermal protection of the core.

Normally, the layer of thermally resistant material is obtained by forming separately from the core two shells or caps, which, once the core has been formed in vacuum conditions, are, one, inserted within the core bringing it into contact with the internal surface of the core itself and, the other, fitted on the core causing it to adhere to its outer surface. Once the coupling is terminated, the caps are vulcanized in autoclave to complete the coating.

The known modality of insulation just described requires three dedicated apparatuses that are different from one another, two for making the caps and the third for assembling the caps themselves on the core. For these reasons, the mode of insulation described involves extremely long times and high costs of implementation, there being necessary three distinct working steps, rendered, on the other hand, even more complex by the particular geometry of the casing. However accurate the operations of production of the shells or caps may be, these frequently have defects and dimensional instability, randomly distributed porosities, and for this reason induce positioning errors or faults.

Even though the maximum care is then taken in positioning and in the subsequent operation of vulcanizing, between the caps and the core there are frequently present areas in which they are not properly stuck together, which, along with the aforesaid porosities, jeopardize sensibly the efficiency of the insulation and consequently the reliability of the casing.

SUMMARY OF THE INVENTION

The aim of the present invention is to provide a method for the production of a casing for a solid-propellant engine, which will enable a simple and inexpensive solution to the problems set forth above.

Provided according to the present invention is a method for the production of a casing for a solid-propellant engine, the casing comprising a core and a layer of elastomeric material set as coating for at least part of said core to define a thermal protection of said core, the method comprising the steps of inserting said core in a forming mould so as to make, within said forming mould, two annular chambers separated from one another by said core, forming a strand of said elastomeric material, cutting transversely said strand in the presence of air to form a portion of elastomeric material, transferring said portion of elastomeric material within a transfer chamber, and injecting said portion of elastomeric material into said annular chambers.

Preferably, in the method defined above, said injection is performed by injecting said portion of material simultaneously in both of said annular chambers so as to fill said two annular chambers simultaneously.

The present invention moreover regards a plant for the production of a casing for a solid-propellant engine.

Provided according to the present invention is a plant for the production of a casing for a solid-propellant engine, the casing comprising a core and a layer of elastomeric material set as coating for at least part of said core to define a thermal protection of said core, the plant comprising:
a forming mould designed to withhold said core and delimiting, in a condition of closing, an annular cavity divided by said core into two annular chambers;
forming means separate from said forming mould for causing a strand of said elastomeric material to come out;
a transfer chamber separate from said forming means and designed to receive a pre-set portion of said elastomeric material and having an inlet opening of said portion communicating with the outside; and
injection means for transferring said elastomeric material into said annular chambers.

Conveniently, in the plant defined above, said injection means comprise a plurality of delivery channels all communicating with said transfer chamber for filling said annular chambers simultaneously.

Finally, the present invention regards a casing for a solid-propellant engine.

Provided according to the present invention is a casing for a solid-propellant engine, the casing comprising a core and a layer of elastomeric material set as coating for at least part of said core to define a thermal protection of said core, said casing being characterized in that said layer is directly co-moulded on said core.

BRIEF DESCRIPTION OF THE DRAWINGS

The invention will now be described with reference to the attached figures, which illustrate a non-limiting example of embodiment thereof and in which:

FIG. 4 illustrates partially in cross section a preferred embodiment of the casing made according to the dictates of the present invention; and FIG. 5 is a view according to the line V-V of FIG. 4.

DETAILED DESCRIPTION OF THE INVENTION

Figure 1:
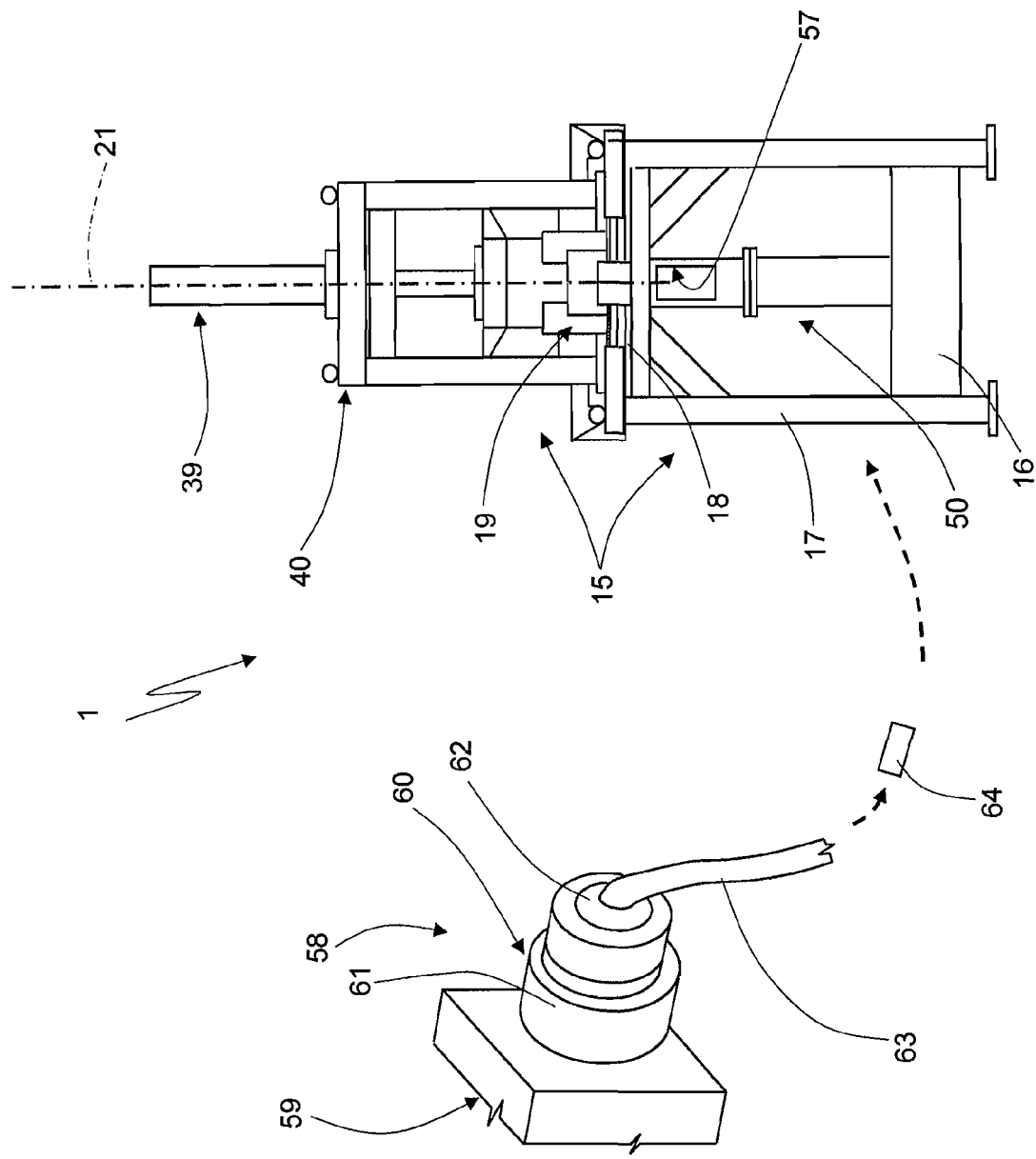
FIG. 1 illustrates schematically a preferred embodiment of a plant for the production of the casing according to the present invention.

In FIG. 1, designated as a whole by 1 is a plant for the production of an insulated casing 2 (FIGS. 4 and 5) of a solid-propellant engine (not illustrated) for a rocket engine.

With reference to FIG. 4, the casing 2 has an axis of symmetry 3 of its own, and comprises a cylindrical tubular intermediate portion 4 coaxial to the axis 3, a spherical-cap portion 5 for closing a longitudinal end of the intermediate portion 4, and an externally threaded cylindrical terminal stretch 6 opposite to the portion 5. The casing 2 is delimited by an inner surface 8 and by an outer surface 9, and is constituted by a core 10, terminating with the stretch 6 and made conveniently of metal material or of other equivalent material resistant to the mechanical and thermal stresses of operation of the casing 2, and by a layer 12 of thermally insulating elastomeric material. The layer 12 coats the core 10 completely except for the part of the terminal stretch 6 provided with the external thread, as indicated in FIG. 4, to define a thermal protection of insulation from the core 10 itself.

Once again with reference to FIG. 1, the plant 1 comprises a supporting structure 15, which, in turn, comprises a base 16, from which there rise uprights 17 for supporting an intermediate plate or platform 18, which supports a forming mould 19 for forming the casing 2.

Figure 2:
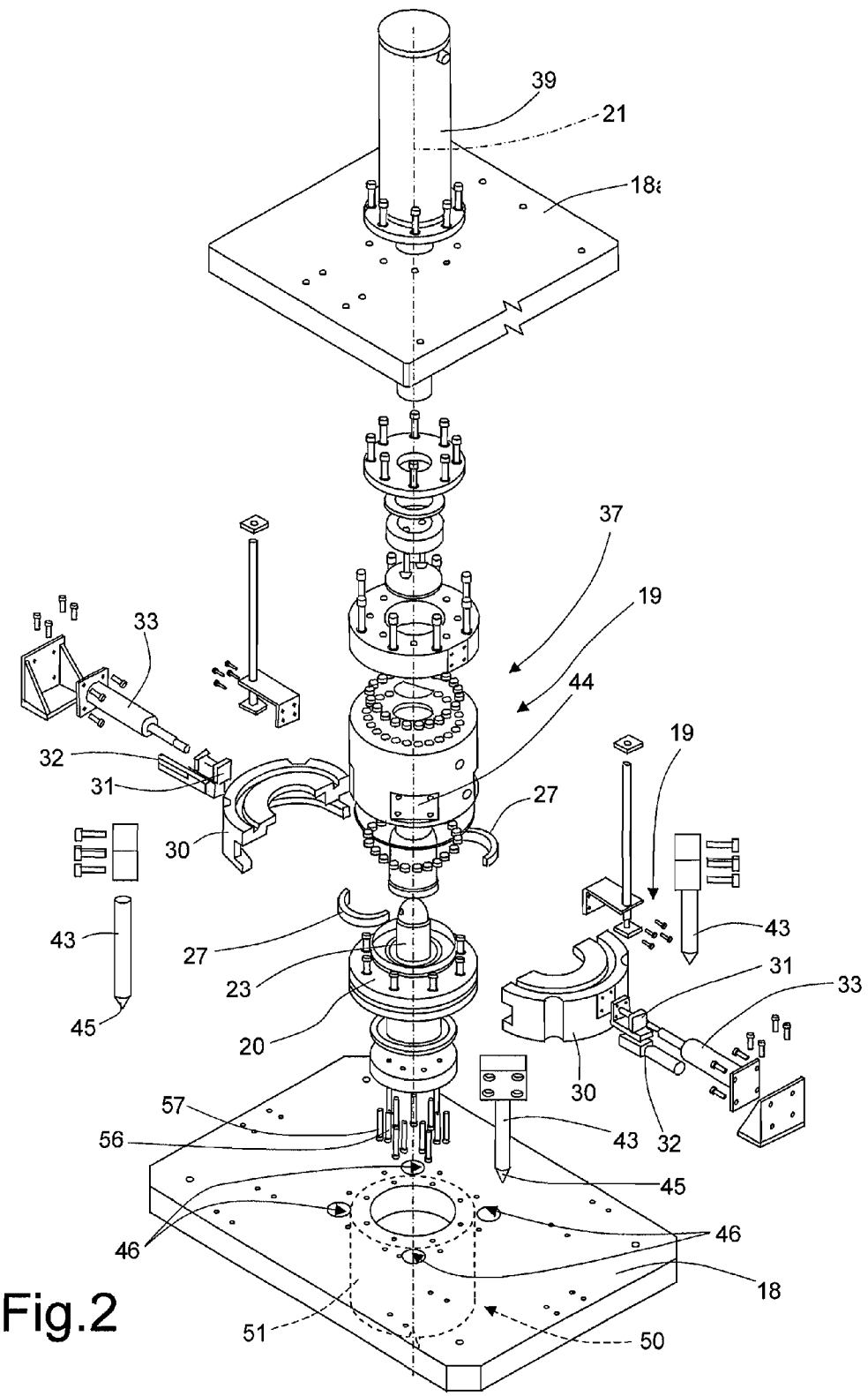
FIG. 2 is an exploded perspective view of a detail of FIG. 1.
Figure 3:
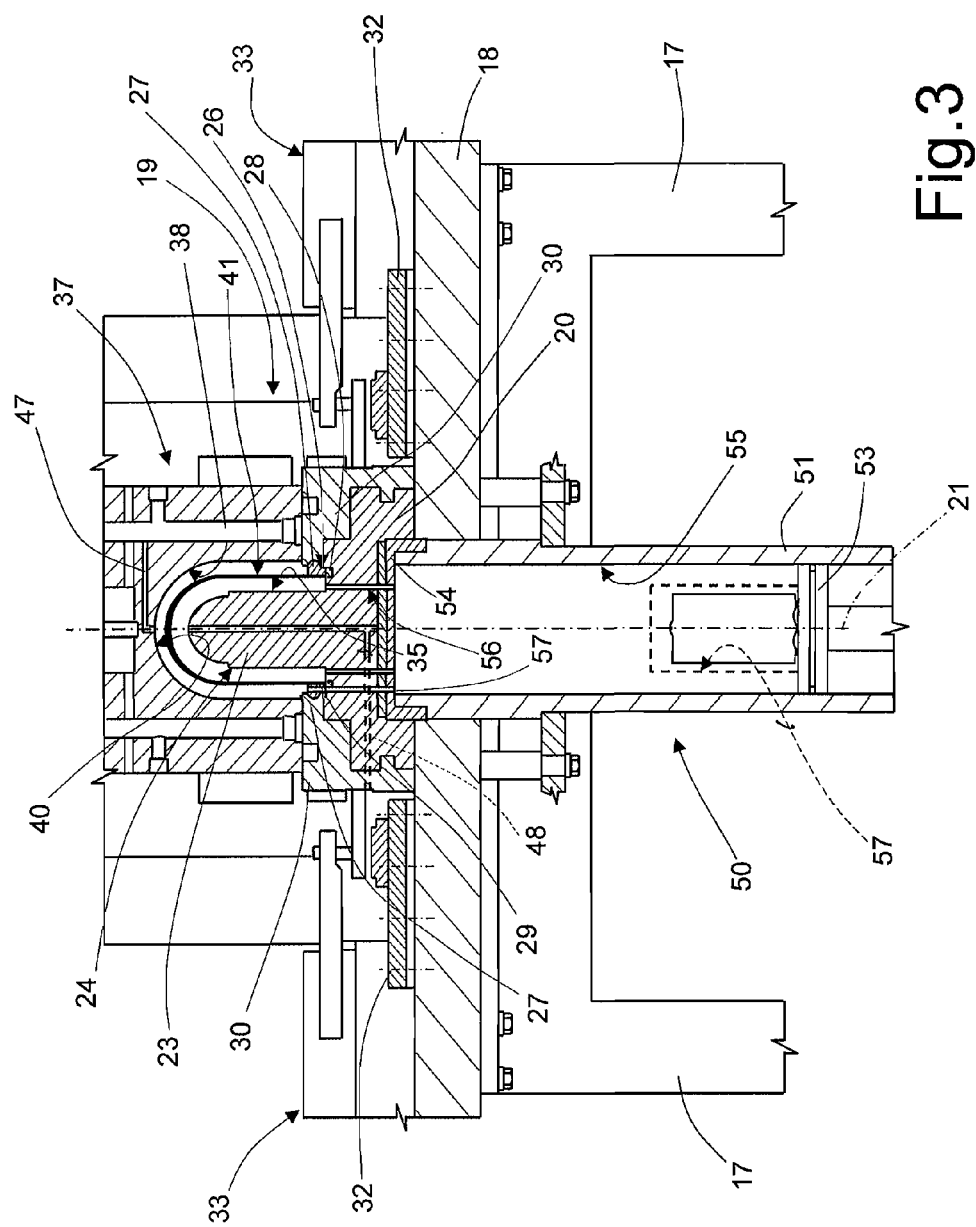
FIG. 3 illustrates, in cross section and at an enlarged scale, a detail of FIG. 1.

With reference to FIGS. 2 and 3, the mould 19 comprises a cylindrical base portion 20, which has an axis of symmetry 21 of its own orthogonal to the intermediate plate 18, is stably connected to the intermediate plate 18 itself and carries, in turn, stably connected, a male body 23, which extends upwards coaxial to the axis 21 and delimited externally by a surface 24 complementary to the inner surface 8 of the casing 2.

Once again with reference to FIG. 3, the cylindrical base portion 20 comprises an annular resting surface 26, which extends orthogonal to the axis 21, surrounds a base portion of the male body 23 and defines a rest for a front surface of the threaded stretch 6 of the core 10. The core is withheld in a position sharing the axis 21 by two semicircular inserts 27, which surround the threaded stretch 6 and have respective bottom attachment or anchorage portions 28 inserted in a common circumferential groove 29 of the cylindrical base portion 20. The inserts 27 are forced against one another and against the core 10 by a pair of clamping half-rings 30, which are set on diametrally opposite sides of the cylindrical base portion 20 and are coupled to respective slides 31, which translate on corresponding radial guides 32. The radial guides 32 are fixedly connected to the plate 18 and carry coupled to them the slides 31, which displace under the thrust of respective linear actuators 33 between an advanced, operative, position, in which, via the inserts 27, they clamp the core 10 in a position sharing the axis 21, and a resting position where they are set at a distance, in which they enable extraction of the casing 2 that has been formed.

When clamped in a position sharing the axis 21, the core 10 delimits, together with the male body 23, an annular chamber 35 having a shape and dimensions practically equal to the part of the layer 12 that extends within the core 10 itself.

Once again with reference to FIGS. 2 and 3, the mould 19 moreover comprises a top bell 37, which extends in a position coaxial to the axis 21 above the circular portion 20 and the male body 23 and is delimited internally by a surface 38 (FIG. 3) complementary to the outer surface 9 of the casing 2. The bell 37 is mobile under the thrust of a linear actuator 39 of its own carried by a further plate 18a of the parallel structure 15, raised with respect to the plate 18 between a lowered, operative, position (FIG. 3) and a raised, resting, position. When the bell 37 is set in its raised, resting, position, it enables insertion of the core 10 and extraction of the casing 2, whilst when it is set in its lowered position, it is coupled in a fluid-tight way to the half-rings 30 and delimits, together with the inserts 27 and the male body 23, a cavity 40, which is in turn divided by the core 10 to form the annular chamber 35, comprised between the core 10 itself and the male body 23, and a further annular chamber 41, comprised between the core 10 and the bell 37.

The relative positioning of the bell 37 with respect to the cylindrical base portion 20 and the stability of the bell 37 itself when it is set in its lowered position are ensured by a plurality of centring and retention pins 43, which extend from a side wall 44 of the bell 37 in cantilever fashion towards the intermediate plate 18 in a direction parallel to the axis 21 and terminate with respective tapered end centring portions inserted in corresponding axial holes 46 of the intermediate plate 18 itself (FIG. 2).

Once again with reference to FIG. 3, the bell 37 and the male body 23 are traversed by respective ducts, designated by 47 and 48, respectively, the inlets of which give out into the annular chamber 41 and, respectively, into the annular chamber 35 and the outlets of which (not visible in the attached figures) are connected to a suction source for creating a desired negative pressure in the annular chambers 41 and 35 themselves.

Once again with reference to FIG. 1 and, in particular, to FIG. 3, the plant 1 moreover comprises a transfer device 50 for transferring simultaneously and in a single operation a mass of elastomeric material within the annular chambers 35 and 41.

The device 50 comprises a cylindrical casing 51, which extends underneath the plate 18 sharing the axis 21 and houses, in an axially slidable way, a force plug 53 mobile in opposite directions under the thrust of a linear actuator (not visible in the attached figures).

The force plug 53 delimits, together with the casing 51 and a plug body 54 for closing the top end of the casing 51 itself a transfer chamber 55. The chamber 55 communicates permanently with the chamber 35 through a plurality of calibrated passages or injection nozzles 56 made through the plug body 54 and with the chamber 41 through a plurality of passages or injection nozzles 57, which are made through the plug body 54 and the plate 18 and form part, together with the passages 56, of the device 50.

The chamber 55 communicates directly with the outside through a side opening 57 (FIGS. 1 and 3), which is closed, in use, in a fluid-tight way by a hatch and through which a pre-set amount of elastomeric material is manually inserted.

The elastomeric material is prepared and dispensed in a forming unit, which forms part of the plant 1 and is designated by 58 in FIG. 1.

The forming unit 58 comprises an assembly 59 for preparation of the elastomeric material and an extruder assembly 60, which receives the elastomeric material from the assembly 59 through a duct 61 and comprises a forming head 62 or die plate designed to form a continuous strand 63 of elastomeric material outwards. At outlet from the head 62, the strand is cut transversely to size in a known way to form a block 64 of elastomeric material, which has dimensions such as to enable insertion thereof in the transfer chamber 55 through the opening 57.

Operation of the plant 1 will now be described starting from the condition in which:
  the mould 19 is set in a closed condition and houses the core 10, the stretch 6 of which is stably clamped between the sectors 27;
  the hatch is opened, enabling access to the transfer chamber 55; and
  the force plug 53 of the transfer device 50 is set in a retracted position, in which it enables insertion of the body of elastomeric material 64 into the chamber 55 itself.

Starting from said condition, the elastomeric material used for formation of the layer 12 is prepared in the assembly 59, and once the desired chemico-physical conditions are reached, is fed through the duct 61 to the head 62, which progressively forms the strand 63 and causes it to advance outwards, as may be seen in FIG. 1. On the outside of the head 62, the strand 63 is cut transversely to size to form the block 64. The block 64 is transferred manually to the cylindrical casing 51 of the device 50 and inserted within the chamber 55 through the opening 57. Once the hatch is closed, the force plug 53 is activated and displaces the block 64 into an intermediate raised position, in which it remains for a pre-set time in order to enable homogenization of the temperatures, after the force plug itself has progressively advanced towards the plug body 54. During advance of the force plug 53, the annular chambers 35 and 41 are set in communication with the suction source, and the elastomeric material traverses progressively the channels or nozzles 56 and 57, coming to fill the chambers 35 and 41 progressively. The force plug 53 proceeds its travel of feed until the chambers 35 and 41 are completely filled with elastomeric material under pressure, which is, at this point, forced on the core 10 and adheres to the core 10 itself. At this point, the mould 19 is heated and the elastomeric material is vulcanized on the core 10, where it remains stably blocked and in an unchanged position over the entire side surface of the core 10 itself so completing the casing 2. Once vulcanizing is completed, the mould 19 is opened, and the insulated casing 2 is extracted from the mould 19 following the operation described previously in reverse. Next, holes A visible in FIGS. 4 and 5 are made on the insulated casing 2.

From the foregoing, it appears evident how the described mode of production of the casing 2 will enable, first of all, simultaneous production in a single operation of the entire thermal coating or the entire insulation of the metal core 10. The mode of implementation described, precisely on account of the fact that it enables formation on the outside of the mould of a homogeneous mass of elastomeric material and injection of said mass directly and simultaneously into the two annular chambers 35 and 41 of the mould 19, prevents onset of gas-holes and/or porosities in the elastomeric material, which is consequently distributed homogeneously over the core 10, thus eliminating any possibility of localized overheating of the core 10 itself. The fact, then, of vulcanizing the elastomeric material directly in the forming mould enables a uniform adhesion of the elastomeric material to the core 10, definitively eliminating the problem of areas that are not properly stuck together, and thus solving all the problems of reliability and functional efficiency of the casing.

As compared to the known solutions, the plant 1 described is extremely simple to produce at particularly contained costs.

Not only, but the plant 1 described, precisely because it enables separation of the step of preparation of the elastomeric material from the step of injection of the elastomeric material itself in the mould, enables injection of all those materials the chemico-physical characteristics of which are in themselves not modifiable. In other words, particularly important and advantageous is the fact of being able to extrude the elastomeric material in an external environment, as well as the possibility of it being introduced in the mould only after the exact amount thereof has been dispensed and after the thermal conditions that are optimal for the specific application have been reached.

From the foregoing, it appears clearly how modifications and variations can be made to the plant 1 described herein, without thereby departing from the sphere of protection defined by the annexed claims.

In particular, the mould could be made in a way different from the one indicated by way of example, and for instance in such a way as to enable injection of the elastomeric material at different times into the two chambers.

The invention claimed is:

1. A casing for a solid-propellant engine, the casing comprising an inner surface,
    an outer surface,
    a core between the inner and outer surfaces, and having a threaded cylindrical terminal portion at one end,
    a layer of thermally insulating elastomeric material coated directly on the entirety of the surfaces of said core including on the side of the core facing the inner surface and the side of the core facing the outer surface of the casing but not on said terminal portion.

2. The casing of claim 1 wherein the thread of said threaded extension comprises an external thread.

3. The casing of claim 2 wherein the elastomeric material is co-molded on said core.

* * * * *